US009710662B2

(12) United States Patent
Nguyenvan

(10) Patent No.: US 9,710,662 B2
(45) Date of Patent: Jul. 18, 2017

(54) IMAGE PROCESSING APPARATUS AUTOMATICALLY REQUESTING PERMISSION TO USE SERVER

(71) Applicant: Brother Kogyo Kabushiki Kaisha, Nagoya-shi, Aichi-ken (JP)

(72) Inventor: Thanh Nguyenvan, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 14 days.

(21) Appl. No.: 14/258,057

(22) Filed: Apr. 22, 2014

(65) Prior Publication Data
US 2014/0325604 A1    Oct. 30, 2014

(30) Foreign Application Priority Data

Apr. 30, 2013    (JP) .................................. 2013-095450

(51) Int. Cl.
*G06F 7/04* (2006.01)
*G06K 15/00* (2006.01)
(Continued)

(52) U.S. Cl.
CPC ........ *G06F 21/608* (2013.01); *H04L 63/0815* (2013.01); *G06F 2221/2141* (2013.01)

(58) Field of Classification Search
CPC .... G06F 3/1275; G06F 3/1214; G06F 3/1288; G06F 3/1287; G06F 21/608
See application file for complete search history.

(56) References Cited

U.S. PATENT DOCUMENTS 6,897,974 B1 * 5/2005 Coker .................. G06F 3/1205
358/1.13
7,600,676 B1 * 10/2009 Rados .................... G06Q 20/40
235/380
(Continued)

FOREIGN PATENT DOCUMENTS

JP    2006-099714 A    4/2006
JP    2008-083809 A    4/2008
(Continued)

OTHER PUBLICATIONS

Jun. 5, 2015—(US) Notice of Allowance—U.S. Appl. No. 14/281,966.
(Continued)

*Primary Examiner* — Dede Zecher
*Assistant Examiner* — Abdullah Almamun
(74) *Attorney, Agent, or Firm* — Banner & Witcoff, Ltd.

(57) ABSTRACT

An image processing apparatus may include a communication device, an image processing device, a reception device, at least one processor, and a memory. The communication device may be configured to communicate with a server. The reception device may be configured to receive first authentication data and a request for using the server. The memory may store computer executable instructions that, when executed by the at least one processor, cause the image processing apparatus to: allow a user to login when the first authentication data satisfies a prescribed authentication condition; automatically request, to the server, permission to use the server regardless of whether the reception device receives the request, once the user has logged in; and execute an image process using both the image processing device and the server.

19 Claims, 9 Drawing Sheets

(51) Int. Cl.
*G06F 21/60* (2013.01)
*H04L 29/06* (2006.01)

(56) References Cited

U.S. PATENT DOCUMENTS

| | | | |
|---|---|---|---|
| 8,370,903 B2 | 2/2013 | Teramoto et al. | |
| 8,433,781 B2 | 4/2013 | Hashimoto et al. | |
| 8,699,052 B2 | 4/2014 | Ito | |
| 8,750,147 B2 | 6/2014 | Iwaya et al. | |
| 8,854,669 B1* | 10/2014 | Jazayeri | G06F 3/1204 358/1.15 |
| 2005/0154914 A1* | 7/2005 | Eguchi | G06F 21/35 726/4 |
| 2006/0012825 A1 | 1/2006 | Kadowaki | |
| 2006/0136992 A1* | 6/2006 | Shigeeda | G06F 21/608 726/2 |
| 2008/0074693 A1 | 3/2008 | Hashimoto et al. | |
| 2008/0282333 A1 | 11/2008 | Teramoto et al. | |
| 2009/0077644 A1* | 3/2009 | Hammell | H04L 63/0815 726/7 |
| 2009/0279117 A1* | 11/2009 | Kondo | B41J 29/38 358/1.14 |
| 2011/0222102 A1 | 9/2011 | Ito | |
| 2011/0235085 A1* | 9/2011 | Jazayeri | G06F 3/1204 358/1.14 |
| 2011/0307582 A1 | 12/2011 | Iwaya et al. | |
| 2012/0140285 A1* | 6/2012 | Kamath | G06F 3/1204 358/1.15 |
| 2014/0067131 A1* | 3/2014 | Park | A47L 15/4293 700/275 |
| 2014/0355053 A1 | 12/2014 | Ota | |

FOREIGN PATENT DOCUMENTS

| | | |
|---|---|---|
| JP | 2008-282216 A | 11/2008 |
| JP | 2011-191888 A | 9/2011 |
| JP | 2011-258141 A | 12/2011 |

OTHER PUBLICATIONS

Aug. 1, 2014—(US) Non-Final Office Action—U.S. Appl. No. 14/281,966.
Feb. 27, 2015—(US) Final Office Action—U.S. Appl. No. 14/281,966.
Feb. 7, 2017—(JP) Office Action—App 2013-114534, Eng Tran.

* cited by examiner

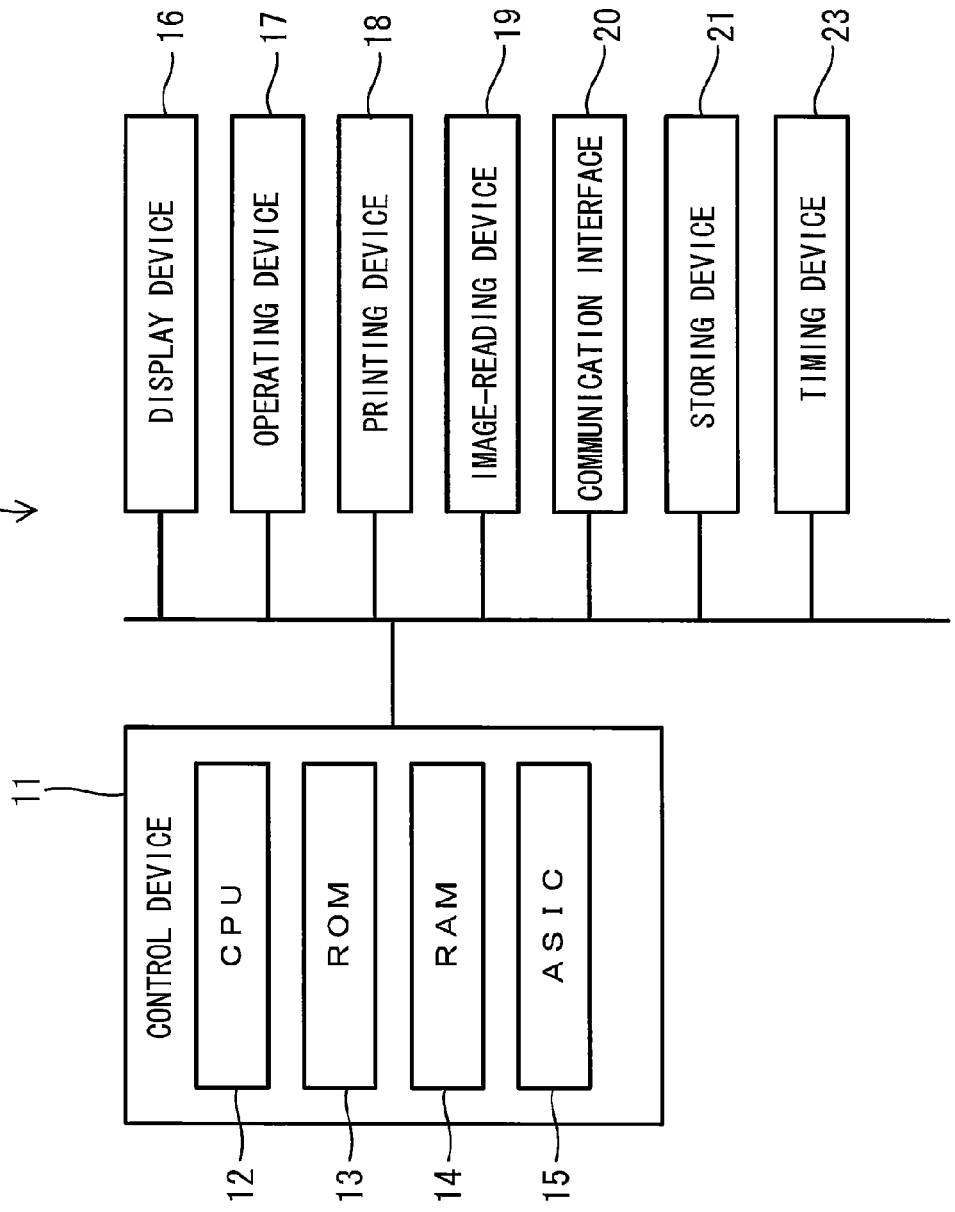

FIG. 3

| USER MANAGEMENT TABLE |||||
|---|---|---|---|---|
| USER A | LOGIN DATA | USER IDENTIFICATION DATA || UserA |
| | | PASSWORD || 111111 |
| | AUTHORIZED FUNCTIONS | PRINTING FUNCTION || YES |
| | | IMAGE-READING FUNCTION || YES |
| | | COPYING FUNCTION || NO |
| | PRINTING SHEET LIMIT ||| 300 |
| | PRINTED SHEET TOTAL ||| 246 |
| | SIGN-IN DATA | COMPANY A PRINTING SERVICE | USER ID | UserA_a |
| | | | PASSWORD | 222222 |
| | | COMPANY A IMAGE STORING SERVICE | USER ID | (UNREGISTERED) |
| | | | PASSWORD | (UNREGISTERED) |
| | | ⋮ | ⋮ | ⋮ |
| | | COMPANY C IMAGE STORING SERVICE | USER ID | UserA_c |
| | | | PASSWORD | 333333 |
| USER B | ⋮ | ⋮ | ⋮ | ⋮ |
| USER C | ⋮ | ⋮ | ⋮ | ⋮ |
| ⋮ | ⋮ | ⋮ | ⋮ | ⋮ |
| USER N | ⋮ | ⋮ | ⋮ | ⋮ |

FIG. 4

LOGIN SCREEN (30)

- USER ID
- PASSWORD
- CANCEL | OK

OPENING SCREEN (31)
PLEASE SELECT FUNCTION TO USE

- 32a: COMPANY A IMAGE STORING SERVICE
- 32b: COMPANY A PRINTING SERVICE — ③ 34
- 32c: COMPANY B IMAGE STORING SERVICE — ② 33
- 32d: COMPANY B PRINTING SERVICE
- 32e: COMPANY C IMAGE STORING SERVICE
- 32f: COMPANY C PRINTING SERVICE

SIGN-IN SCREEN (35)

- USER ID
- PASSWORD
- CANCEL | OK

IMAGE PROCESSING APPARATUS AUTOMATICALLY REQUESTING PERMISSION TO USE SERVER

CROSS REFERENCE TO RELATED APPLICATION

This application claims priority from Japanese Patent Application No. 2013-095450 filed Apr. 30, 2013. The entire content of the priority application is incorporated herein by reference.

TECHNICAL FIELD

The present invention relates to a technology for executing image processes using servers and an image processor.

BACKGROUND

One technology known in the art for logging in to web services displays a screen for accessing web services after the user has logged in to the image-forming apparatus. After the user has selected a desired web service on the screen, the image-forming apparatus transmits service login data for logging in to the web service.

SUMMARY

However, completing the login takes some time after the service login data has been transmitted. Thus, a user who has selected a web service with the conventional technology is forced to wait before being able to use the service.

Therefore, it is an object of the present invention to provide a technique for reducing the time that an authorized user of an image processor is required to wait until a server becomes available after inputting a command to access the server.

In order to attain the above and other objects, the invention provides an image processing apparatus. The image processing apparatus may include a communication device, an image processing device, a reception device, at least one processor, and a memory. The communication device may be configured to communicate with a server. The reception device may be configured to receive first authentication data and a request for using the server. The memory may store computer executable instructions that, when executed by the at least one processor, cause the image processing apparatus to: allow a user to login when the first authentication data satisfies a prescribed authentication condition; automatically request, to the server, permission to use the server regardless of whether the reception device receives the request, once the user has logged in; and execute an image process using both the image processing device and the server.

According to another aspect, the present invention provides a method. The method may be for controlling an image processing apparatus having an image processing device and capable of communicating with a server. The method may include receiving first authentication data; allowing a user to login to the image processing apparatus when the first authentication data satisfies a prescribed authentication condition; automatically requesting, to the server, permission to use the server regardless of whether the receiving receives the request, once the user has logged in; and executing an image process using both the image processing device and the server.

According to still another aspect, the present invention includes a non-transitory computer readable storage medium. The storage medium may store a set of program instructions installed on and executed by a computer for controlling an image processing apparatus having an image processing device and capable of communicating with a server. The program instructions may include: receiving first authentication data; allowing a user to login to the image processing apparatus when the first authentication data satisfies a prescribed authentication condition; automatically requesting, to the server, permission to use the server regardless of whether the receiving receives the request, once the user has logged in; and executing an image process using both the image processing device and the server.

BRIEF DESCRIPTION OF THE DRAWINGS

The particular features and advantages of the invention as well as other objects will become apparent from the following description taken in connection with the accompanying drawings, in which:

FIG. 2 is a block diagram illustrating an electrical configuration of a multifunction peripheral according to the embodiment;

FIG. 3 is an explanatory diagram of a user management table according to the embodiment;

FIG. 4 is an explanatory diagram illustrating screens on a display device according to the embodiment;

DETAILED DESCRIPTION

Figure 1:
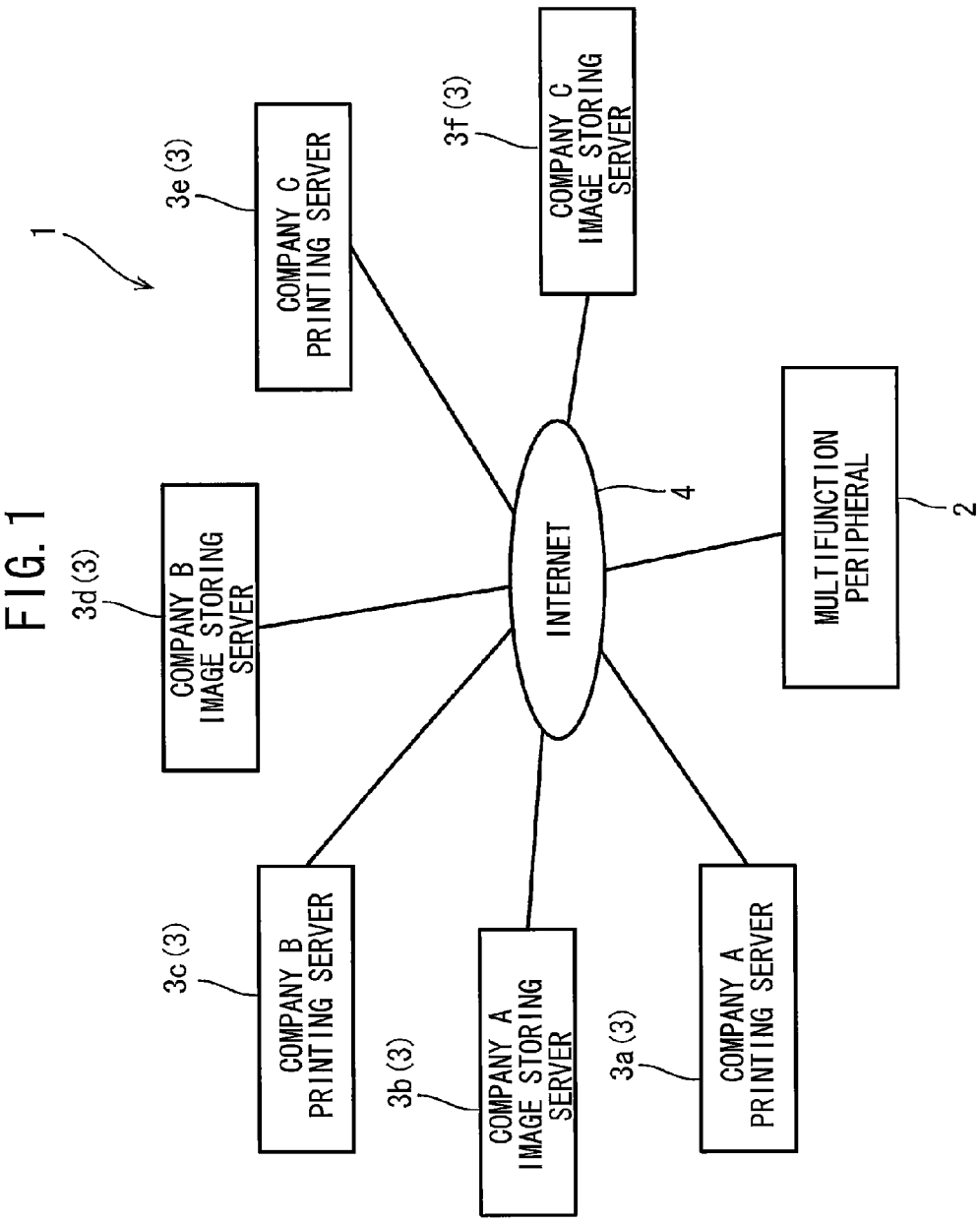
FIG. 1 is an explanatory diagram of an image-processing system according to an embodiment of the invention.

First, the configuration of an image-processing system 1 according to an embodiment of the invention will be described with reference to FIG. 1. The image-processing system 1 includes a multifunction peripheral 2 serving as an image processor, and a plurality of servers 3 (3a-3f). The multifunction peripheral 2 is connected to and capable of communicating with the servers 3 via a communication network 4, such as a local area network (LAN) or an internet. In the example of FIG. 1, the multifunction peripheral 2 is connected to the servers 3 via an internet.

The multifunction peripheral 2 is provided with a plurality of functions, such as a printing function, an image-reading function, and a copying function. The multifunction peripheral 2 may include various other functions in addition to these functions, such as a facsimile function.

The servers 3 are computers that provide various services to client devices, such as the multifunction peripheral 2, via the communication network 4. In the following description, a printing service and an image-storing service are used as examples of these services.

The printing service is implemented as follows. A printing apparatus, such as the multifunction peripheral 2, issues a request to a server to transmit desired image data for printing. Upon receiving this request, the server transmits image data saved on the server to the printing apparatus.

The image-storing service is implemented as follows. A client device connected to the communication network 4 transmits image data to the server, and the server saves this image data.

The multifunction peripheral 2 can implement image processes using the servers 3 and image-processing devices, such as a printing device 18 and an image-reading device 19 described later (see FIG. 2). More specifically, the multifunction peripheral 2 is capable of implementing image processes using a server 3 that provides a printing service and the printing device 18 (hereinafter referred to as an image process employing the printing device 18 and a printing service), and an image process using a server 3 that provides an image-storing service and the image-reading device 19 (hereinafter referred to as an image process employing the image-reading device 19 and an image-storing service).

In the image process employing the printing device 18 and a printing service, the multifunction peripheral 2 issues a request to a print server 3 to transmit image data and subsequently controls the printing device 18 to print an image represented by image data received from the print server 3. In the image process using the image-reading device 19 and an image-storing service, the multifunction peripheral 2 controls the image-reading device 19 to scan an original and produce image data based on the original, and transmits this image data to an image-storing server 3 to be stored.

In order to use the multifunction peripheral 2, a user must log in to the multifunction peripheral 2 by inputting into the multifunction peripheral 2 user identification data and a password that have been previously recorded in the multifunction peripheral 2. The multifunction peripheral 2 determines whether the inputted user identification data and password satisfy an authentication condition. If the authentication condition is satisfied, login authentication is successful, and the multifunction peripheral 2 enters a logged-in state in which the user has permission to use the multifunction peripheral 2. However, if the authentication condition is not satisfied, the multifunction peripheral 2 does not enter the logged-in state. The authentication condition is satisfied when the combination of user identification data and password has been recorded in a user management table 22 described later (see FIG. 3).

In the following description, the term "login data" will be used to denote the user identification data and password required for logging in to the multifunction peripheral 2. Login data is an example of the first authentication data.

Similarly, in order to use one of the web services described above, the user must sign in to the service by transmitting to the server 3 user identification data and a password that have been pre-recorded in the server 3. Here, user identification data and a password are recorded for each service, and the user must sign in to each service separately to use the service. The server 3 performs authentication based on the received user identification data and password and allows use of the service when authentication was successful, while denying use of the service when authentication was not successful.

In the following description, the term "sign-in data" will be used to indicate the user identification data and the password required for signing in to a service. The sign-in data is an example of the second authentication data. Further, transmitting the sign-in data to the server 3 is an example of requesting the server 3 for access permission.

Note that while the terms "login" and "sign-in" are used to differentiate between authorizing different types of access, the terms essentially have the same meaning.

Next, the electrical structure of the multifunction peripheral 2 will be described with reference to FIG. 2. The multifunction peripheral 2 includes a control device 11, a display device 16, an operating device 17, a printing device 18, an image-reading device 19, a communication interface 20, a storage device 21, and a timing device 23.

The control device 11 includes a CPU 12, a ROM 13, a RAM 14, and an ASIC 15. The CPU 12 controls the components of the multifunction peripheral 2 by executing control programs stored in the ROM 13 or the storage device 21. The ROM 13 stores such control programs executed by the CPU 12 and various types of data. The RAM 14 serves as the main storage device for the CPU 12 when the CPU 12 is executing various processes.

The display device 16 includes a liquid crystal display, a drive circuit that drives the liquid crystal display. The display device 16 is an example of the notification device. The operating device 17 includes a touchscreen that covers the liquid crystal display, a plurality of operating buttons. The user can input various commands and data by operating the operating device 17. Note that the touchscreen is not required, and the operating device 17 may be configured to accept operations only through the operating buttons. The operating device 17 is an example of the reception device.

The printing device 18 has an electrophotographic system, inkjet system, or the like for printing images on printing paper or other sheets based on image data received from a server 3, image data generated by the ASIC 15, and the like. The printing device 18 is an example of the image-processing device.

The image-reading device 19 includes a light source for irradiating light onto an original, an image sensor, and the like. The image-reading device 19 scans an original to generate image data. The image-reading device 19 is an example of the image-processing device.

The communication interface 20 is a hardware circuit for connecting the multifunction peripheral 2 to the communication network 4. The communication interface 20 is an example of the communication device.

The storage device 21 is a hard disk drive, flash memory, or the like that uses nonvolatile memory to store various programs and data. The storage device 21 stores the user management table 22 (see FIG. 3) described later, and the sign-in history of users signing in to each service, for example. The storage device 21 is an example of the storage device. Note that the control device 11 may be provided with flash memory to be used as the storage device.

The timing device 23 keeps track of the current time.

The multifunction peripheral 2 may also be provided with a USB host interface device that is detachably connected to a USB memory or other USB mass storage device, and a memory card reader having memory slots shaped to conform to the standards of various removable memory cards.

Next, the user management table 22 stored in the storage device 21 will be described with reference to FIG. 3. Data is recorded in the user management table 22 for each user and includes login data, authorized functions, printing sheet limit, printed sheet total, and sign-in data for each service.

The authorized functions are data indicating which features of the multifunction peripheral 2 the user is authorized to use. A "Yes" is recorded in the user management table 22 for features that the user is authorized to use, and a "No" for those features that the user is not authorized to use.

The printing sheet limit denotes the maximum number of sheets that the user may print. In some cases, the printing sheet limit may be set for each department to which the users belong.

The printed sheet total is the accumulated number of sheets that the user has printed. Each time the user executes a printing operation, the number of sheets of paper used for the printing operation is added to the printed sheet total. When the printed sheet total reaches the printing sheet limit, the user is forbidden from printing further. The printed sheet total can be reset to zero by the administrator of the multifunction peripheral 2, for example. Once the printed sheet total has been reset to zero, the user may once again perform printing operations. If the printing sheet limit is set as a daily limit, the multifunction peripheral 2 may be configured to automatically reset the printed sheet total to zero at a preset time.

Next, the process of recording login data and sign-in data will be described. The administrator of the multifunction peripheral 2 records the login data in the user management table 22 while the user records the sign-in data. However, for some services the user may not yet have recorded sign-in data. The process of recording sign-in data will be described later. The sign-in data includes user identification data and password.

Note that while the following description covers an example in which each user records sign-in data for each individual service, the multifunction peripheral 2 may be configured to use a single set of sign-in data for all services universally. Further, the sign-in data may be shared among a plurality of users.

Next, the user interface of the multifunction peripheral 2 will be described with reference to FIG. 4. While a user is not logged in to the multifunction peripheral 2, the multifunction peripheral 2 stands by while displaying a login screen 30 shown in FIG. 4 on the display device 16. After the user inputs login data in the login screen 30, the multifunction peripheral 2 authenticates the login based on the inputted login data.

When authentication is successful, the multifunction peripheral 2 displays an opening screen 31 on the display device 16. Once the opening screen 31 has been displayed, the user is able to use the multifunction peripheral 2.

The opening screen 31 includes various function buttons 32 (32a-32f) for selecting functions. The selectable functions include the printing function, the image-reading function, and the copying function mentioned above, as well as functions for executing image processes using the image-processing device and one of various services. For simplicity, the functions shown in FIG. 4 include only those functions for executing image processes using the image-processing device and the various services.

In the example of FIG. 4, the opening screen 31 includes six function buttons 32. Of these, the "Company A image-storing service" button 32a is provided for selecting a function that executes an image process using the image-storing service provided by Company A and the image-reading device 19. The "Company B image-storing service" button 32c and "Company C image-storing service" button 32e are provided for similarly selecting functions that execute image processes using the image-storing services respectively provided by Company B and Company C and the image-reading device 19.

Further, the "Company A printing service" button 32b is provided for selecting a function that executes an image process using a printing service provided by Company A and the printing device 18. The "Company B printing service" button 32d and "Company C printing service" button 32f are provided for similarly selecting functions that execute image processes using the printing services respectively provided by Company B and Company C and the printing device 18.

The action of selecting one of the function buttons 32 in the opening screen 31 is an example of inputting a command for accessing one of the servers 3.

A certain amount of time is required for the sign-in process to be completed after sign-in data is transmitted to the server 3. It is conceivable that the sign-in data is transmitted to the server 3 after the user has selected one of the function buttons 32 in the opening screen 31. However, in this conceivable method, the user must wait until the service becomes available. Therefore, after the multifunction peripheral 2 in the embodiment has successfully authenticated the login, the multifunction peripheral 2 transmits sign-in data to the servers without waiting for the user to select one of the function buttons 32 in the opening screen 31.

The encircled numbers 2 and 3 in the opening screen 31 are new items 33 and 34, respectively. The new items indicate the number of items of data that have been newly saved on the server 3 for the corresponding service since the service was last used. As shown in FIG. 4, the server 3 manages the count of new items for each service provided.

The multifunction peripheral 2 acquires data related to the notification of new items from the server 3 for each service and displays the number of new items indicated by this data in the opening screen 31 so that the number overlaps the function button 32 used to select the function that uses the corresponding service. Since the multifunction peripheral 2 signs in to each service (the multifunction peripheral 2 performs a sign-in process to each service by the identification data of the login user) without waiting for the user to select one of the function buttons 32 in the opening screen 31, as described above, the multifunction peripheral 2 displays the number of new items for each function button 32 before the user selects the function button 32.

The function buttons 32a and 32d in the opening screen 31 are shaded to represent function buttons 32 that use services for which the user has yet to sign in. As described above, sign-in data may not have been recorded in the user management table 22 for some services. Since the sign-in data cannot be transmitted to the server 3 regarding services for which sign-in data has not yet been recorded, the multifunction peripheral 2 grays out, or shades, the function buttons 32 used to select functions using these services in order to indicate to the user that the user has yet to sign in to these services.

If the user selects one of the shaded function buttons 32, the multifunction peripheral 2 displays a sign-in screen 35 shown in FIG. 4. The user can input sign-in data in the sign-in screen 35, at which time the multifunction peripheral 2 will sign in to the service by transmitting this sign-in data to the server 3 and will record the inputted sign-in data in the user management table 22.

Note that an automatic sign-in function described later can be set for each service. The multifunction peripheral 2 has automatic sign-in settings for each service. That is, if an automatic sign-in setting is off, the multifunction peripheral 2 does not automatically signs-in a service corresponding to the automatic sign-in setting. Thus, there may be a service to which the multifunction peripheral 2 does not automatically sign-in to the server 3 (because of the sign-in settings, for example), even though the multifunction peripheral 2 had previously recorded sign-in data in the user management table 22 for that service. Since the multifunction peripheral 2 has not been signed in for this service, the multifunction peripheral 2 displays the corresponding function button 32 as a grayed-out, or shaded, button. However, the multifunction peripheral 2 does not request the user to input sign-in data upon selecting one of these function buttons 32, but simply signs in to the service by transmitting the sign-in data recorded in the user management table 22 to the corresponding server 3.

Automatic sign-in is a process that the multifunction peripheral 2 performs when the user logs in to the multifunction peripheral 2. The Automatic sign-in signs in to services by transmitting sign-in data to the servers 3 without waiting for the user to select function buttons 32 in the opening screen 31. In a settings screen (not shown) displayed on the display device 16, each user of the multifunction peripheral 2 can preset an automatic sign-in setting for each service. The multifunction peripheral 2 can perform the automatic sign-in process only for those services set for automatic sign-in by the user, when the user has logged in to the multifunction peripheral 2. The process that the CPU 12 performs to display this settings screen and to receive an automatic sign-in setting is an example of a process to receive a setting about whether to perform automatically requesting the permission to use the server 3.

When the user has not turned on the automatic sign-in setting for a service, the multifunction peripheral 2 signs in to that service only after the user has selected a function button 32 that uses the service. In the following description, the process of signing in to a service not configured for automatic sign-in after the user selects a function button 32 that uses the service will be called a manual sign-in.

Note that manual sign-in is not only performed when the user has selected a function button 32 for a function that uses a service not configured for automatic sign-in. Specifically, manual sign-in is performed in the following three cases.

Case 1: Sign-in data has been recorded in the user management table 22, but the user has not been automatically signed in for the service because the automatic sign-in setting is off.

Case 2: The automatic sign-in setting is on, but the user was not automatically signed in for the service because sign-in data is not recorded in the multifunction peripheral 2.

Case 3: Sign-in data for the service is not recorded in the user management table 22 and the automatic sign-in setting for the service is off.

Next, processes executed by the control device 11 will be described with reference to FIG. 5. The control device 11 executes a control program to implement a login process 41, an opening screen display process 42, an image processing control process 43, a sign-out process 44, and a logout process 45. Arrows in FIG. 5 denote calling relationships, data flow, or both.

Figure 5:
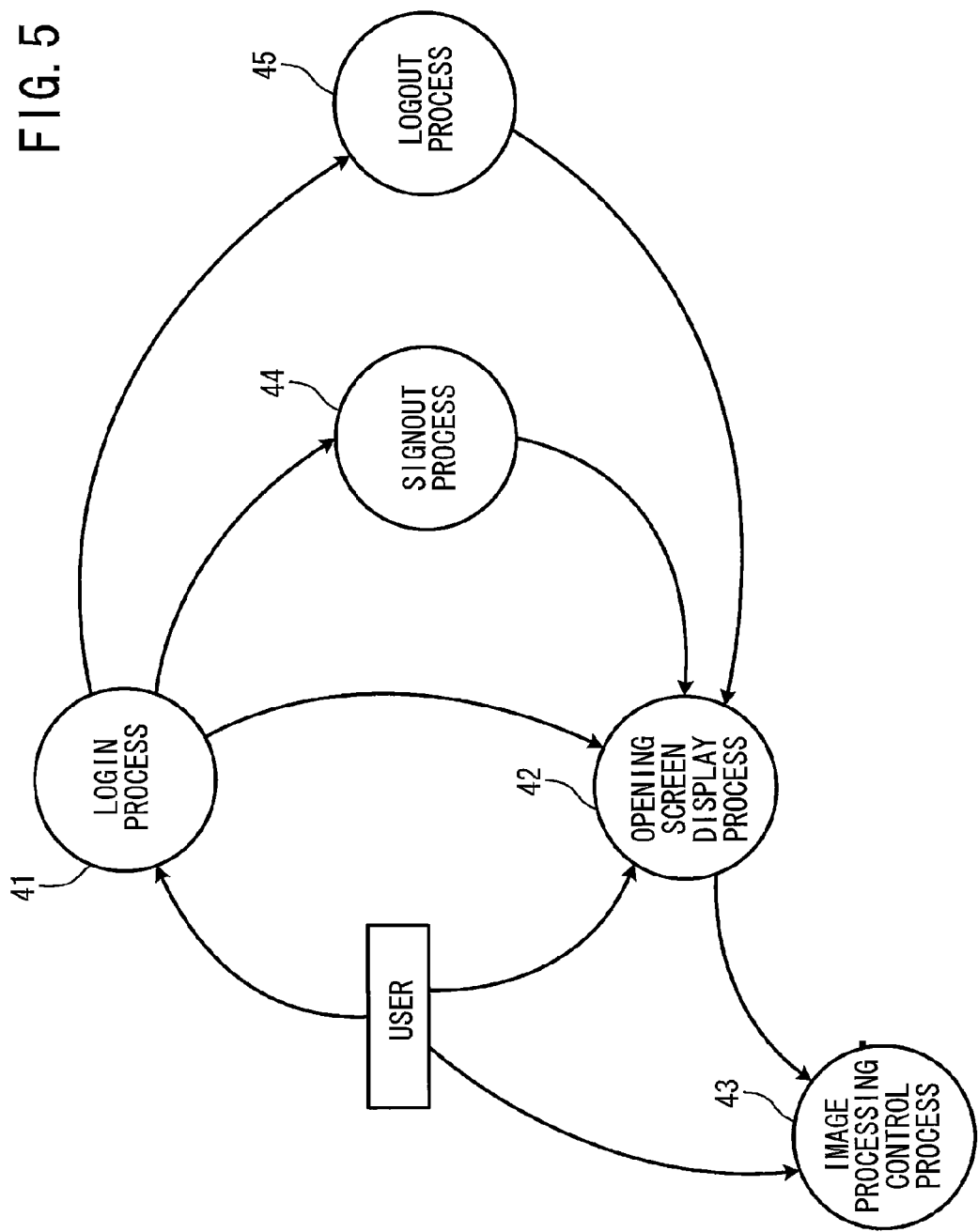
FIG. 5 is an explanatory diagram illustrating processes executed by a control device according to the embodiment.

The control device 11 also executes processes other than those indicated in FIG. 5, but a detailed description of these processes has been omitted. Below, each of the processes in FIG. 5 will be described.

In the login process 41, the control device 11 displays the login screen 30 on the display device 16 while the user has not yet logged in and, when login data has been inputted in the login screen 30, executes a login procedure for authenticating the login using the inputted login data.

In the opening screen display process 42, the control device 11 executes a process to display the opening screen 31; a process to display new item numbers over function buttons 32 based on data for new item notifications received from the login process 41 or sign-out process 44 when such data has been received; a process to initiate the image processing control process 43 when the user selects a function button 32 using services that have been automatically signed in; and a manual sign-in process for manually signing in to a service to which the user has not been automatically signed in, when the user selects a function button 32 whose function uses the service.

In the opening screen display process 42, the control device 11 executes a logout process for the user that is currently logged in either (1) when the user selects a logout button (not shown) in the opening screen 31 or (2) when a notification has been received from the logout process 45 indicating that an operation has not been received for a prescribed time.

In the image processing control process 43, the control device 11 executes an image process using the image-processing device and a service. The image processing control process 43 is called when (1) the user selects a function button 32 in the opening screen 31 that uses the service for which the user has been automatically signed in or (2) when executing a manual sign-in process. The process executed according to the image processing control process 43 is an example of a process that executes an image process using both one device 18 or 19 and the server 3.

Even when the automatic sign-in process is performed for a service, it is possible that the user may select the function button 32 for the service in the opening screen 31 before the sign-in process has completed. In this case, the control device 11 executing the image processing control process 43 waits until the sign-in process is completed before executing the function.

In the sign-out process 44 the control device 11 executes a sign-out process for signing the user out of a service when an image process using the image-processing device and the service could not be executed after successfully signing in the user to the service through an automatic sign-in or manual sign-in process. Signing out is a process of announcing via an intent to the server 3 to end use of a service.

Here, the multifunction peripheral 2 cannot execute an image process using the image-processing device and the service when the image-processing system 1 enters a state in which the multifunction peripheral 2 can no longer execute the function using the service. Using a printing service as an example, the multifunction peripheral 2 cannot execute a function using the service when the printing device 18 cannot print. The printing device 18 cannot print when the amount of remaining colorant is less than a reference quantity, paper is not loaded in the multifunction peripheral 2, a paper jam has occurred in the multifunction peripheral 2, or the printed sheet total has reached the printing sheet limit.

In the case of an image-storing service, the multifunction peripheral 2 cannot execute the function using the service when the image-reading device 19 cannot read an image. The image-reading device 19 cannot read an image when an original is not set in the automatic document feeder (ADF) and when the document cover is left open over the original placed on the flatbed of the image-reading device 19.

In the following description, the result of determining that an image process using the image-processing device and the service cannot be executed after the user was successfully signed in to the service will be used to indicate that the sign-out condition has been met.

In the logout process 45, the control device 11 monitors the operating device 17 and issues, when an operation has not been performed for the prescribed time, a notification indicating that the operation has not been performed for the prescribed time, to the opening screen display process 42.

Figure 6:
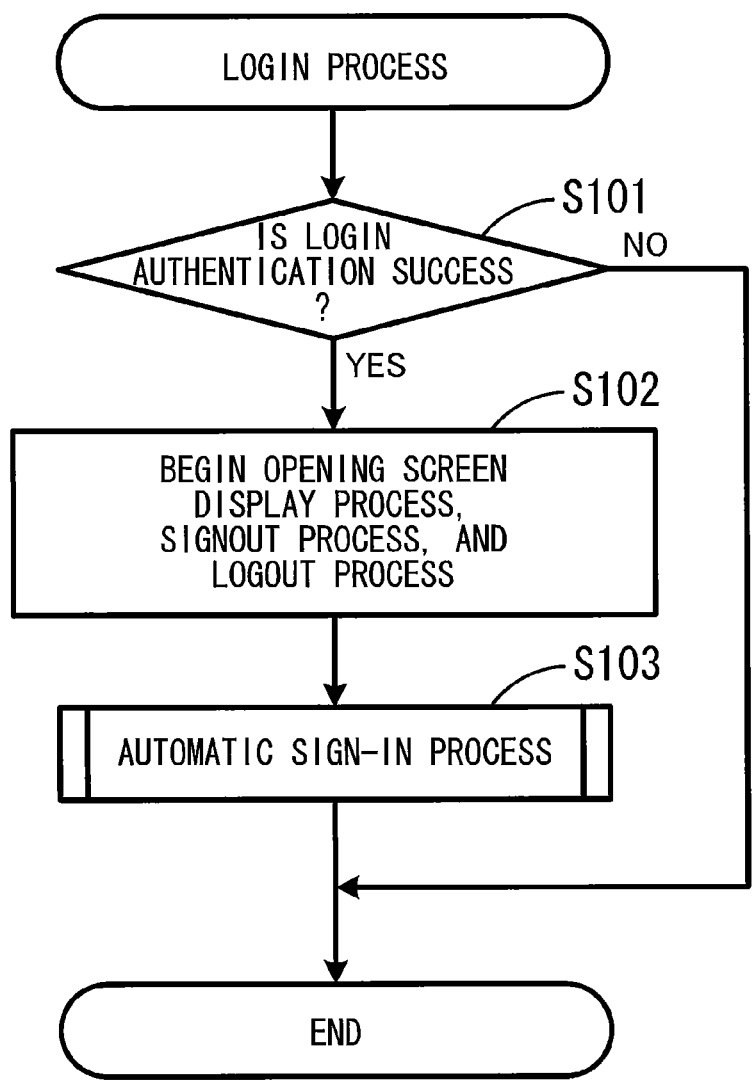
FIG. 6 is a flowchart illustrating a login process according to the embodiment.

Next, steps in the login procedure executed according to the login process 41 will be described with reference to FIG. 6. The following description will begin after the user has inputted login data in the login screen 30.

In S101 the CPU 12 determines whether the inputted login data satisfies the authentication condition. Specifically, the CPU 12 determines whether the combination of user identification data and password inputted in the login screen 30 is recorded in the user management table 22. If this combination of data is recorded in the user management table 22, then the CPU 12 determines that the authentication condition is satisfied and that the login authentication was a success, and advances to S102. If the combination of data is not recorded in the user management table 22, then the CPU 12 determines that the authentication condition was not satisfied and deems the login authentication to be a failure, and ends the current login process.

In S102 the CPU 12 begins the opening screen display process 42, the sign-out process 44, and the logout process 45. In S103 the CPU 12 executes the automatic sign-in process. Note that while the following description covers the case in which the opening screen display process 42, the sign-out process 44, and the logout process 45 are started prior to executing the automatic sign-in process, as shown in the flowchart of FIG. 6, part or all of these processes may be initiated after the automatic sign-in process.

Figure 7:
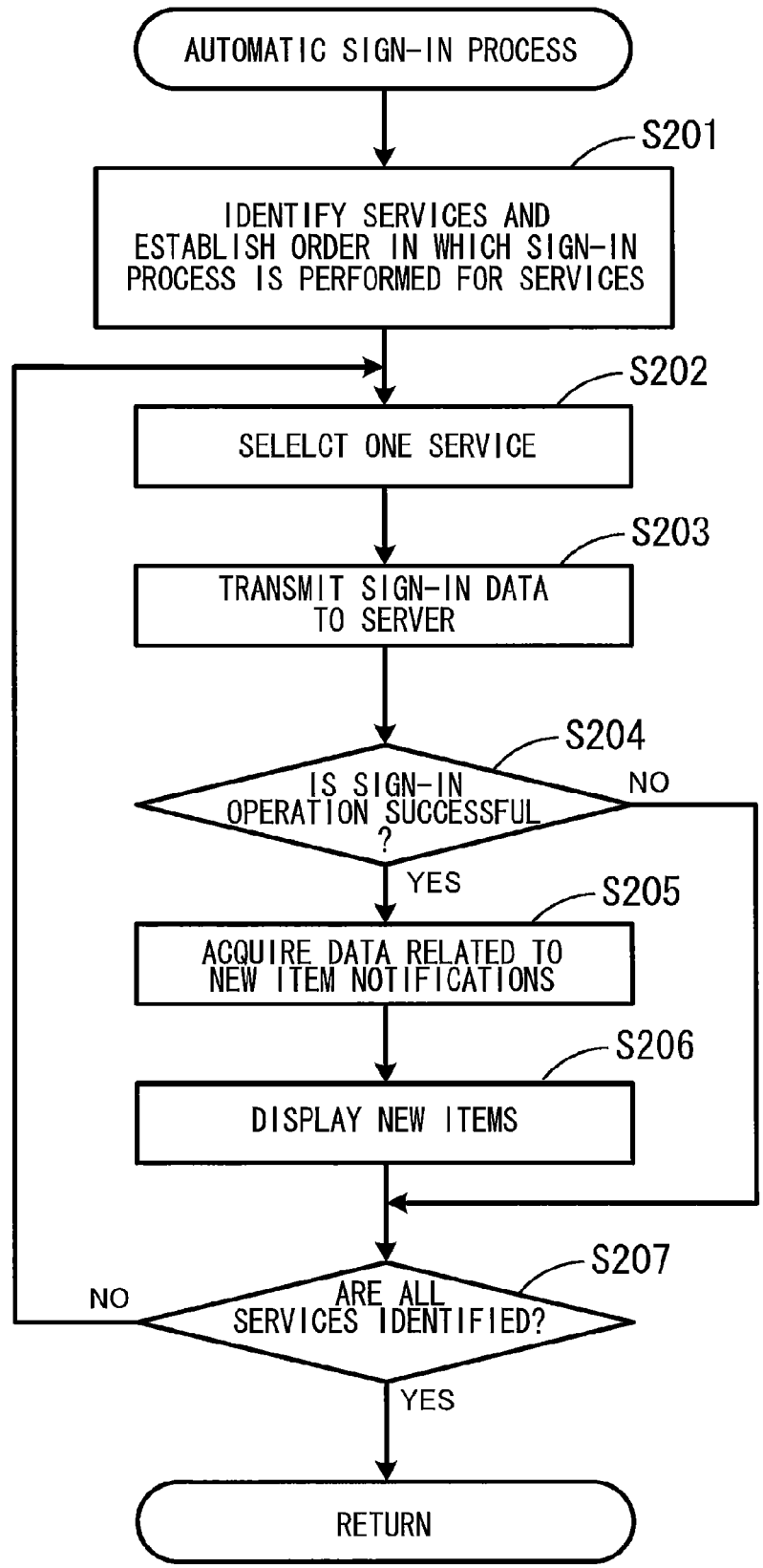
FIG. 7 is an automatic sign-in process according to the embodiment.

Next, the automatic sign-in process executed in S103 of FIG. 6 will be described with reference to FIG. 7.

In S201 the CPU 12 identifies the services for which an automatic sign-in shall be performed, and establishes an order for performing the sign-in processes. This will be described next in greater detail.

First, the method of identifying services for which the sign-in process is to be performed will be described. The CPU 12 identifies those services that meet all conditions a-d below as services for which the sign-in process is to be performed.

Condition a: sign-in data for the service has been recorded in the user Management Table 22

Services for which sign-in data is not recorded in the user management table 22 are excluded from the list of sign-in candidates. The process for determining whether sign-in data has been recorded in the user management table 22 for a service is an example of a process to determine whether sign-in data is stored in the user management table 22. Here, the sign-in data is assigned with the server 3 and the login data that allows the user to login.

Condition b: use of the service's function has been permitted

Here, "function" denotes the printing function, the image-reading function, and the copying function rather than a function for executing the image process using the image-processing device and the service. For example, the printing service provided by Company A is a service that uses the printing device 18. In this case, if access to the printing device 18 has not been granted to the user currently logged in to the multifunction peripheral 2, the user cannot use this printing service with the printing device 18. Thus, performing a sign-in process for the printing service provided by Company A while the user does not have permission to access the printing device 18 would result in wasteful communication between the multifunction peripheral 2 and the server 3. In order to cut down on such wasteful communication, the CPU 12 excludes services using functions for which the current user has no access privileges from the list of sign-in candidates.

Condition c: automatic sign-in setting for the service is ON

Services are excluded from the list of sign-in candidates when the automatic sign-in setting for the services has not been set to ON in the settings screen (not shown) described above.

Condition d: service's function is currently operable

Since a user cannot use a service whose function is not operable, services using inoperable functions are excluded from the list of sign-in candidates.

Next, the process of establishing an order in which the sign-in process is performed for the services not excluded by the above conditions will be described. The CPU 12 establishes the order in which the multifunction peripheral 2 signs in to services based on the sign-in history for each service. For example, the CPU 12 may set a sign-in order from highest to lowest in number of sign-in processes performed for each service over the past month. This will be described next in greater detail.

The CPU 12 acquires the current time from the timing device 23 each time a function button 32 is selected. Here, the current time indicates the current year, month, day, hour, minute, and second. The CPU 12 stores the current time acquired from the timing device 23 associated with the user ID of the user currently logged in to the multifunction peripheral 2, and service identification data indicating the service used by the function corresponding to the selected function button 32 in the storage device 21 as the user's sign-in history. Thereafter, when determining the sign-in order for services, the CPU 12 references the sign-in history associated with the user ID of the user currently logged in to the multifunction peripheral 2 and totals the number of times that the user has signed in to a service over the past month for each service not excluded by the above conditions. Next, the CPU 12 establishes the sign-in order as the order from highest to lowest number of sign-in processes.

Note that rather than setting the sign-in order based on the number of sign-ins over the past month, the order may be set according to the frequency of sign-ins per month. Further, while the past month is used as a sample period for totaling the number of sign-in operations, this period may be set to an arbitrary length. Alternatively, rather than focusing on any single period, the CPU 12 may count the total number of sign-in operations that the user performed for a service beginning from the first time the service was used. Further, rather than using the number of sign-in operations, the CPU 12 may set the sign-in order of the most recent date and time (year, month, day, hour, minute, and second) that the user signed in to each service. Further, the number of sign-in operations performed for each service need not be limited to an individual user, but may be the total number of times all users have signed in for the services.

In S202 the CPU 12 selects one service from the collection of services identified in S201 based on the order established in the same step.

In S203 the CPU 12 reads, from the user management table 22, sign-in data for the service selected in S202 that corresponds to the user identification data of the user currently logged in to the multifunction peripheral 2. The CPU 12 transmits this sign-in data to the server 3 that provides this service. S203 is an example of a process that automatically requests, to the server 3, permission to use the server 3 regardless of whether the multifunction device 2 receives a request for using the server 3 once the user has logged in to the multifunction device 2.

The server 3 determines whether the user identification data and password received from the multifunction peripheral 2 is recorded in the server 3 as sign-in data for the corresponding service and determines that the sign-in operation is successful when the data is recorded in the server 3. The server 3 then transmits the authentication results indicating whether the sign-in data was authenticated to the multifunction peripheral 2.

In S204 the CPU 12 determines whether the sign-in operation was successful based on the authentication results received from the server 3. In other words, the CPU 12 determines that the sign-in operation was a success when the authentication results received from the server 3 indicate a successful authentication. On the other hand, the CPU 12 determines that the sign-in operation was a failure when the authentication results received from the server 3 denote a failed authentication or when authentication results were not received from the server 3 within a prescribed time. The CPU 12 advances to S205 when the sign-in operation was successful. The CPU 12 advances to S207 when the sign-in operation failed.

In S205 the CPU 12 acquires data from the server 3 related to new item notifications for the service selected in S202.

In S206 the CPU 12 displays in the opening screen 31 a number of new items represented by the data acquired in S205. More specifically, the CPU 12 outputs data related to the new item notifications to the opening screen display process 42. In the opening screen display process 42, the CPU 12 displays the number of new item represented by the data outputted in S206 over the function button 32 used to select the function for using the service selected in S202.

In S207 the CPU 12 determines whether all services identified in S201 have been selected. The CPU 12 returns to the login process when all services have been selected (S207: YES), and returns to S202 to repeat the above process when there remain services that have not been selected (S207: NO).

Figure 8:
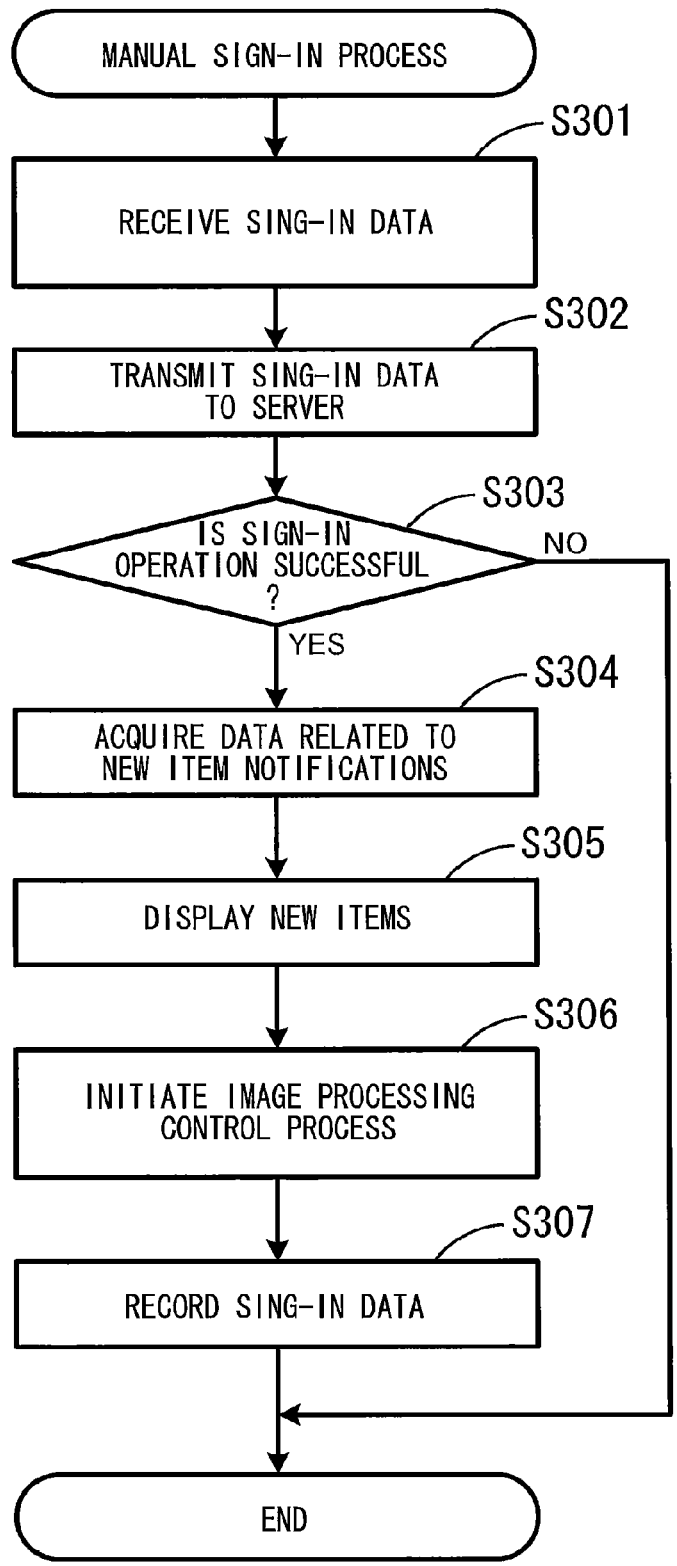
FIG. 8 is a manual sign-in process according to the embodiment.

Next, steps in the manual sign-in process executed according to the opening screen display process 42 will be described with reference to FIG. 8. The CPU 12 begins this process when a function button 32 has been selected for a function using a service to which the user has not yet signed in on the opening screen 31. As described above, there are three cases in which a manual sign-in is performed. The following description is an example for cases in which sign-in data has not yet been recorded in the user management table 22 (Case 2 and Case 3).

In S301 the CPU 12 displays the sign-in screen 35 on the display device 16 and subsequently waits until the user inputs sign-in data (identification data and password). S301 is an example of a process to receive an input of the sign-in via the operating device.

In S302 the CPU 12 transmits the sign-in data inputted in S301 to the server 3. S302 is an example of a process to send the sign-in data to the server 3 to request the permission to use the server 3 upon receipt of the input of the sign-in data.

In S303 the CPU 12 determines whether the sign-in operation was successful based on the authentication results received from the server 3. The CPU 12 advances to S304 when the sign-in was successful and ends the current process when the sign-in failed.

In S304 the CPU 12 acquires data related to new item notifications from the server 3 for the corresponding service.

In S305 the CPU 12 displays new items represented in the data acquired in S304 over the corresponding function button 32. S305 is an example of a notification process to notify the received new items.

In S306 the CPU 12 initiates the image processing control process 43.

In S307 the CPU 12 records the sign-in data inputted in S301 in the user management table 22. S307 is an example of a process to store the inputted sign-in data.

Note that the process described above is essentially the same for Case 1, except that the sign-in data is acquired from the user management table 22 in S301, and the process to record sign-in data in S307 is omitted.

Figure 9:
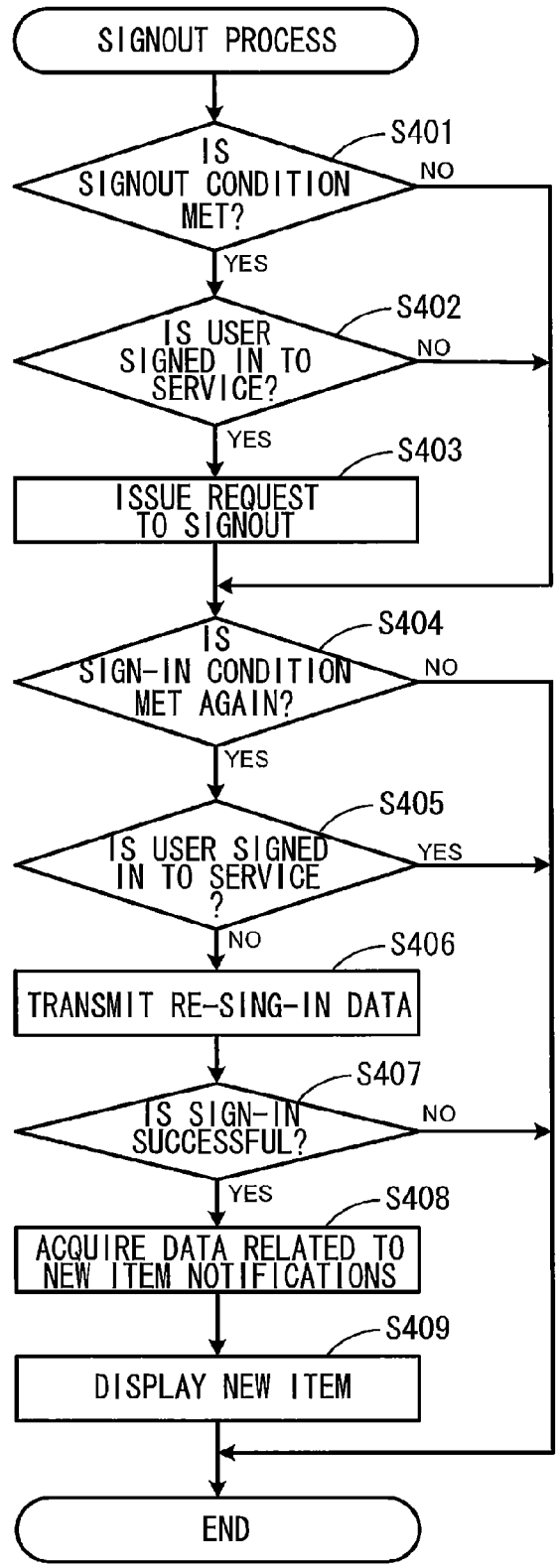
FIG. 9 is a sign-out process according to the embodiment.

Next, steps in the sign-out procedure executed according to the sign-out process 44 will be described with reference to FIG. 9. The sign-out procedure is repeatedly executed at prescribed intervals.

In S401 the CPU 12 determines whether the sign-out condition has been met. The CPU 12 advances to S402 when the sign-out condition was met and advances to S404 when the sign-out condition was not met.

In S402 the CPU 12 determines whether the user is currently signed in to the service that is the subject of the sign-out process. The CPU 12 advances to S403 if the user is currently signed in. The CPU 12 advances to S404 if the user is not currently signed in.

In S403 the CPU 12 issues, to the server 3 that provides a service for executing image processes using a function no longer in an operable state, a request to sign out from the service. For example, if the printing function has become inoperable, the CPU 12 signs out from the printing services provided by Company A, Company B, and Company C.

S401-S403 described above is an example of a process to end using the server 3 or to terminate availability of the server 3.

In S404 the CPU 12 determines whether the sign-in condition has again been met, or simply a re-sign-in condition has been met. A sign-in condition is satisfied again when the sign-out condition, previously satisfied, is no longer satisfied. For example, the printing function may become unusable when the printed sheet total reaches the printing sheet limit, prompting the CPU 12 to issue sign-out requests in S403.However, after the printed sheet total has been reset to zero, the printing function returns to an executable state. At this time, the sign-out condition is no longer satisfied. When the sign-out condition is no longer satisfied, the CPU 12 determines that the sign-in condition is again satisfied and advances to S405.

However, the CPU 12 will not determine that the re-sign-in condition has been satisfied in S404, even though the sign-out condition is not satisfied, if the sign-out condition was not met in S401 because a re-sign-in is a process for signing into a service again after temporarily signing out of the service.

In S405 the CPU 12 determines whether the user has already signed in to the service in question. The CPU 12 advances to S406 if the user is not signed in. On the other hand, the CPU 12 ends the process if the user is already signed in.

In S406 the CPU 12 transmits re-sign-in data to the server 3 to sign in the user to the service. For example, if the printing device 18 became inoperable, the CPU 12 transmits sign-in data to the print server 3 of Company A, the print server 3 of Company B, and the server 3 of Company C to sign in to the printing services provided by these servers 3.

S404-S406 described above is an example of a process to automatically re-request the permission to use the server when a state in which an image process is incapable of being executed is switched to a state in which the image process is capable of being executed.

Steps S407-S409 described next cover a process executed for each server 3 to which sign-in data was transmitted in S406.

In S407 the CPU 12 determines whether the sign-in was successful based on authentication results received from the server 3. The CPU 12 advances to S407 when sign-in was successful, and ends the current process when sign-in failed.

In S408 the CPU 12 acquires data related to new item notifications for the service in which the user was signed in in S406.

In S409 the CPU 12 outputs the data acquired in S408 to the opening screen display process 42. In S409 is an example of the notification process.

When a login on the multifunction peripheral 2 has been successfully authenticated, the multifunction peripheral 2 in the embodiment described above signs in the user to services without waiting for the user to select function buttons 32 in the opening screen 31. Accordingly, the multifunction peripheral 2 according to the embodiment can shorten the time that a user authorized to use the multifunction peripheral 2 must wait before using a service after selecting the function button 32 corresponding to that service, in comparison to a device that waits for the user to select a function button 32 before signing in to the corresponding service.

Further, the multifunction peripheral 2 does not automatically sign in to services that have not been set up for automatic sign-in. Turning off the automatic sign-in option for a service eliminates unnecessary communication with the servers 3 providing the service to sign in to the services provided by the servers 3 when the user does not intended to use those services. Thus, by providing a setting for not automatically signing in to services that the user will not use, the multifunction peripheral 2 can reduce wasteful communication with the servers 3.

The multifunction peripheral 2 also does not sign the user in to services when image processes using the services and the image-processing device cannot be executed. Thus, when an image process cannot be executed, the multifunction peripheral 2 avoids unnecessary communications with servers 3 whose services are used by the image process by not signing in to these services. Hence, the multifunction peripheral 2 reduces wasteful communications with servers 3 by not signing in to services provided by the servers 3 when image processes using these services cannot be executed.

Further, since the multifunction peripheral 2 signs in to services in order, beginning from those service most frequently used, the multifunction peripheral 2 can make the most frequently used services available sooner than less frequently used services.

The multifunction peripheral 2 also terminates the availability of services when image processes using these services and the image-processing device can no longer be executed. Accordingly, the multifunction peripheral 2 can reduce unnecessary communications with servers 3 whose services are used by image processes that are no longer executable.

Further, if an image process once again becomes executable after the multifunction peripheral 2 has ended availability of a service used by the image process when the image process became nonexecutable, the multifunction peripheral 2 re-transmits sign-in data to the corresponding server 3 to sign in for the service. Therefore, the multifunction peripheral 2 can shorten the time required for the service to become available if the user subsequently selects a function using this service.

The multifunction peripheral 2 also records sign-in data inputted in the manual sign-in process in the user management table 22 in association with the login data for the current user. Accordingly, the multifunction peripheral 2 can eliminate the need for the user to re-input the sign-in data when the user selects the function button 32 thereafter, making the system more user-friendly.

Further, by displaying the number of new items over corresponding function buttons 32, the multifunction peripheral 2 enables the user to quickly learn information for each service.

While the invention has been described in detail with reference to the embodiment thereof, it would be apparent to those skilled in the art that various changes and modifications may be made therein without departing from the scope of the invention.

(1) In the embodiment described above, the user logs in to the multifunction peripheral 2 by inputting login data in the login screen 30. However, the multifunction peripheral 2 may be provided with a reading device for reading the ID from a portable storage medium, such as an IC card, a magnetic card, or a card provided with a barcode. In this case, the multifunction peripheral 2 may perform login authentication based on the card ID read from the portable storage medium. Alternatively, the multifunction peripheral 2 may be configured to read biological data, such as a fingerprint, in order to authenticate the login.

In these cases, the card ID or the biological data is an example of the first authentication data. Further, the operating device 17 and the reading device for reading this data are an example of the reception device. In other words, the reception device may be provided with separate structures including a structure for receiving the first authentication data, and a structure for receiving an inputted access command.

It is also possible to connect an external reading device to the multifunction peripheral 2 to be used for reading the card ID or the biological data. In this case, the interface provided in the multifunction peripheral 2 for connecting to the reading device and the operating device 17 are an example of the reception device.

(2) The embodiment describes a case in which the user management table 22 is stored in the storage device 21 provided in the multifunction peripheral 2. However, the user management table 22 may be instead stored on an external server. In this case, the CPU 12 must transmit login data to the external server with a request for authentication. The CPU 12 determines whether the multifunction peripheral 2 is in a logged in state based on authentication results received back from the external server.

(3) In S201 of the automatic login process of the embodiment, the CPU 12 determines which functions that the currently logged-in user is permitted to access. However, it is possible to omit this determination from the automatic login process and to allow the user access to all function once the user's login has been successfully authenticated.

(4) Examples of the image processes using the image-processing device and the servers described in the embodiment include image processes using the printing device 18 and printing services and image processes using the image-reading device 19 and image-storing services. However, the multifunction peripheral 2 may be configured to execute only one type of these image processes.

Further, the multifunction peripheral 2 may execute a process for downloading data from a server and storing the data on USB memory or a removable memory card. Further, the multifunction peripheral 2 may execute a process to upload data stored on the USB memory or removable memory card to a server.

(5) The embodiment describes an example in which the CPU 12 establishes the order for signing in to services based on the user's sign-in history for each service. However, the sign-in operations may be performed in a predetermined order.

(6) The embodiment describes an example in which the servers 3 manage the new item notifications. However, the multifunction peripheral 2 may manage the new item notifications instead. For example, the multifunction peripheral 2 stores the date and time at which a user was previously signed in to each service. The next time the multifunction peripheral 2 signs in to a service, the multifunction peripheral 2 acquires from the server 3 the date and time that each item of image data was saved, and sets the new item data to the number of image data items that were saved after the stored date and time of the previous sign-in.

Alternatively, the multifunction peripheral 2 may save all filenames of image data stored on the server 3 when previously signed in to that server 3. The next time the multifunction peripheral 2 signs in to the same server 3, the multifunction peripheral 2 may set the number of new items to the number of items of image data having filenames that were not saved.

(7) The embodiment describes an example in which the number of new items is displayed over the corresponding function button 32. However, sounds or voices may be used for notifying the user of new items instead. Further, in the embodiment, the user is notified of new item data in the form of the number of image data items. However, new item data is not limited to the number of items of image data, but may be other useful information for the user, such as scheduled maintenance on the server 3 (maintenance date of the server 3).

(8) In the manual sign-in process described in the embodiment, the multifunction peripheral 2 records sign-in data inputted by the user in the user management table 22 automatically. However, the multifunction peripheral 2 may be configured to prompt the user to input whether or not to record the sign-in data and to perform this recording operation only when the user grants permission.

(9) In the embodiment, the CPU 12 determines that a re-sign-in condition has been met when the sign-out condition is no longer satisfied. However, the multifunction peripheral 2 may be configured not to determine that the re-sign-in condition has been met immediately after the sign-out condition is no longer satisfied. For example, the multifunction peripheral 2 may determine that the re-sign-in condition has been met a certain period of time after the sign-out condition is no longer satisfied.

(10) The processes executed according to the control program in the embodiment described above include the login process 41, the opening screen display process 42, the image processing control process 43, the sign-out process 44, and the logout process 45. However, this is only one example, and processes to be executed may be established as needed.

(11) While the CPU 12 is responsible for executing the various processes in the embodiment described above, a portion of these processes may be executed by the ASIC 15. Further, the control device 11 need not be provided with the ASIC 15. Alternatively, the control device 11 may be provided with a plurality of CPUs that share execution of the processes described above.

(12) The multifunction peripheral 2 described in the embodiment is an example of the image processing apparatus according to the present invention. However, the image processing apparatus of the present invention may be applied to a standalone printing apparatus or a standalone image-reading apparatus.

What is claimed is:

1. An image processing apparatus comprising:
   a communication device configured to communicate with a server;
   an image processing device;
   a reception device configured to receive first authentication data and a request for using the server;
   a storage previously storing second authentication data in association with the first authentication data, the storage further previously storing user identification data;
   at least one processor; and
   a memory storing computer executable instructions that, when executed by the at least one processor, cause the image processing apparatus to:
   receive the first authentication data via the reception device;
   determine whether the first authentication data satisfies a prescribed authentication condition, the prescribed authentication condition being that the received first authentication data matches the user identification data stored in the storage;
   receive a setting about whether to perform the transmission of the second authentication data;
   determine whether a setting condition is satisfied, the setting condition being that the setting indicates to perform the transmission of the second authentication data;
   transmit to the server the second authentication data to request permission to use the server, the determination that the first authentication data satisfies the prescribed authentication condition triggering the transmission of the second authentication data to the server, the transmission of the second authentication data to the server being allowed when both the setting condition and the capability condition are satisfied, the transmission of the second authentication data being canceled when at least one of the setting condition and the capability condition is not satisfied, the transmission of the second authentication data triggering execution of an authentication process in which the server that receives the second authentication data determines whether the permission to use the server is granted using the second authentication data;
   allow a user to login when the first authentication data satisfies a prescribed authentication condition; and
   execute the image process using both the image processing device and the server upon receipt of the request.

2. The image processing apparatus according to claim 1, wherein the communication device is configured to communicate with a plurality of servers including the server,
   wherein the storage previously stores a plurality of sets of second authentication data corresponding respectively to the plurality of servers, and
   wherein the image processing apparatus performs transmission of the plurality of sets of second authentication data respectively to the plurality of servers triggered by the determination that the first authentication data satisfies the prescribed authentication condition in and order of frequency in use starting from a server used in highest frequency.

3. The image processing apparatus according to claim 1, wherein the image processing apparatus is configured to be selectively placed in a first state in which the image process is capable of being executed and a second state in which the image process is incapable of being executed, and wherein the computer-executable instructions, when executed by the at least one processor, further cause the image processing apparatus to:

determine whether the first state is switched to the second state after the image processing apparatus acquires the permission to use the server; and end using the server when the first state is switched to the second state.

4. The image processing apparatus according to claim 3, wherein after the image processing apparatus ends using the server, the computer-executable instructions, when executed by the at least one processor, further cause the image processing apparatus to:

determine whether the second state is switched to the first state; and retransmit to the sever the second authentication data to request permission to use the server when the second state is switched to the first state.

5. The image processing apparatus according to claim 1, further comprising a notification device, wherein when the permission to use the server is obtained, the notification device is configured to receive new information about the server from the server and control the notification device to notify the received new information.

6. The image processing apparatus according to claim 1, wherein the image processing apparatus determines that the image process is capable of being executed when use of the image processing device is not permitted to the current user.

7. The image processing apparatus according to claim 1, wherein the computer-executable instructions, when executed by the at least one processor, further cause the image processing apparatus to:

acquire, after a user has logged in, new data from the server related to items of data newly saved on the server for a corresponding service since the service was last used by the user; and display an indication of the acquired new data related to items of data newly saved on the server.

8. The image processing apparatus according to claim 7, wherein the indication corresponds to a number of items of data newly saved on the server for the corresponding service since the service was last used by the user.

9. The image processing apparatus according to claim 1, wherein the storage previously further stores a plurality of sets of second authentication data corresponding respectively to a plurality of services, wherein the computer executable instructions, when executed by the at least one processor, further cause the image processing apparatus to:

receive settings about whether to perform the transmission of respective ones of the plurality of sets of second authentication data;

determine, for each of the plurality of services, whether a setting condition corresponding to the each of the plurality of services is satisfied, the setting condition for the each of the plurality of services being that a setting corresponding to the each of the plurality of services indicates to perform the transmission of one of the plurality of sets of second authentication data corresponding to the each of the plurality of services;

determine, for each of the plurality of services, whether a capability condition is satisfied, the capability condition for the each of the plurality of services being that an image process for the each of the plurality of services is capable of being executed; and transmit to the server each of the plurality of sets of second authentication data to request permission to use a corresponding service of the server, the determination that the first authentication data satisfies the prescribed authentication condition triggering the transmission of the plurality of sets of second authentication data to the server, the transmission of one of the plurality of sets of second authentication data to the server being allowed when both the setting condition and the capability condition are satisfied for a service corresponding to the one of the plurality of sets of second authentication data, the transmission of the one of the plurality of sets of second authentication data being canceled when at least one of the setting condition and the capability condition is not satisfied for the service corresponding to the one of the plurality of sets of second authentication data.

10. A method for controlling an image processing apparatus having an image processing device and a storage previously storing authentication data in association with first authentication data, the storage further previously storing using identification data, the image processing apparatus being capable of communicating with a server, the method comprising:

receiving first authentication data;

determining whether the first authentication data satisfies a prescribed authentication condition, the prescribed authentication condition being that the received first authentication data matches user identification data stored in the storage;

receive a setting about whether to perform the transmission of the second authentication data;

determine whether a setting condition is satisfied, the setting condition being that the setting indicates to perform the transmission of the second authentication data;

determining whether a capability condition is satisfied, the capability condition being that an image process is capable of being executed;

transmitting to the server the second authentication data to request permission to use the server, the determining that the first authentication data satisfies the prescribed authentication conditions triggering the transmitting of the second authentication data to the sever, the transmission of the second authentication data to the server being allowed when both the setting condition and the capability condition are satisfied, the transmission of the second authentication data being canceled when at least one of the setting condition and the capability condition is not satisfied, the transmission of the second authentication data triggering execution of an authentication process in which the server that receives the second authentication data determines whether the permission to use the server is granted using the second authentication data;

allowing a user to login to the image processing apparatus when the first authentication data satisfies a prescribed authentication condition; and executing the image process using both the image processing device and the server upon receipt of the request.

11. The method according to claim 10, further comprising:

receiving a setting about whether to perform the transmitting of the second authentication data triggered by the determining that the first authentication data satisfies the prescribed authentication condition; and determining whether the setting indicates to perform the transmitting of the second authentication data triggered by the determining that the first authentication data satisfies the prescribed authentication condition, wherein the transmitting of the second authentication data triggered by the determining that the first authentication data satisfied the prescribed authentication condition is performed when the setting indicates to perform the transmitting of the second authentication data triggered by the determining that the first authentication data satisfies the prescribed authentication condition whereas the method prohibits the transmitting of the second authentication data triggered by the determining that the first authentication data satisfies the prescribed authentication condition when the setting does not indicate the perform the transmitting of the second authentication data triggered by the determing that the first authentication data satisfies the prescribed authentication condition.

12. The method according to claim 10, further comprising determining whether the image process is capable of being executed, wherein when the image process is capable of being executed, the transmitting of the second authentication data triggered by the determining that the first authentication data satisfies the prescribed authentication condition is performed whereas when the image process is incapable of being executed, the method prohibits the transmitting of the second authentication data triggered by the determining that the first authentication data satisfies the prescribed authentication condition.

13. The method according to claim 10, wherein the image processing apparatus is configured to communicate with a plurality of servers including the server, wherein the storage preciously stores a plurality of sets of second authentication data corresponding respectively to the plurality of servers, and wherein the method further comprises performing transmitting of the plurality of sets of second authentication data respectively to the plurality of servers triggered by the determining that the first authentication data satisfies the prescribed authentication condition.

14. The method according to claim 10, wherein the image processing apparatus is configured to be selectively placed in a first state in which the image process is capable of being executed and a second state in which the image process is incapable of being executed, the method further comprising:
determining whether the first state is switched to the second state after the image processing apparatus acquires the permission to use the server; and
ending using the server when the first state is switched to the second state.

15. A non-transitory computer readable storage medium storing a set of program instructions installed on and executed by a computer for controlling an image processing apparatus having an image processing device and a storage previously storing second authentication data in association with first authentication data, the storage further previously storing user identification data, the image processing apparatus being capable of communicating with a server, the program instructions comprising:

receiving the first authentication data;

determining whether the first authentication data satisfies a prescribed authentication condition, the prescribed authentication condition being that the received first authentication data matches user identification data stored in the storage;

receive a setting about whether to perform the transmission of the second authentication data;

determine whether a setting condition is satisfied, the setting condition being that the setting indicates to perform the transmission of the second authentication data;

determine whether a capability condition is satisfied, the capability condition being that an image process is capable of being executed;

transmitting to the server the second authentication data to request permission to use the server, the determining that the first authentication data satisfies the prescribed authentication condition triggering the transmitting the second authentication data to the server, the transmission of the second authentication data to the server being allowed when both the setting condition and the capability condition are satisfied, the transmission of the second authentication data being canceled when at least one of the setting condition and the capability condition is not satisfied, the transmission of the second authentication data triggering execution of an authentication process in which the server that receives the second authentication data determines whether the permission to use the server is granted using the second authentication data;

allowing a user to login to the image processing apparatus when the first authentication data satisfies the prescribed authentication condition; and executing the image process using both the image processing device and the server upon receipt of the request.

16. The non-transitory computer readable storage medium according to claim 15, wherein the program instructions further comprise:

receiving a setting about whether to perform the transmitting of the second authentication data triggered by the determining that the first authentication data satisfies the prescribed authentication condition; and determining whether the setting indicates to perform the transmitting of the second authentication data triggered by the determining that the first authentication data satisfies the prescribed authentication condition, wherein the transmitting of the second authentication data triggered by the determining that the first authentication data satisfies the prescribed authentication condition is performed when the setting indicates to perform the transmitting of the second authentication data triggered by the determining that the first authentication data satisfies the prescribed authentication condition whereas the program instructions prohibit the transmitting of the second authentication data triggered by the determining that the first authentication data satisfies the prescribed authentication condition when the setting does not indicate to perform the transmitting of the second authentication data triggered by the determining that the first authentication data satisfies the prescribed authentication condition.

17. The non-transitory computer readable storage medium according to claim 15, wherein the program instructions further comprise determining whether the image process is capable of being executed, wherein when the image process is capable of being executed, the transmitting of the second authentication data triggered by the determining that the first authentication data satisfies the prescribed authentication condition is performed whereas when the image process is incapable of being executed, the program instructions prohibit the transmitting of the second authentication data triggered by the determining that the first authentication data satisfies the prescribed authentication condition.

18. The non-transitory computer readable storage medium according to claim 15, wherein the image processing apparatus is configured to communicate with a plurality of servers including the server, wherein the storage previously stores a plurality of sets of second authentication data corresponding respectively to the plurality of servers, and wherein the program instructions further comprise transmitting the plurality of sets of second authentication data respectively to the plurality of servers triggered by the determining that the first authentication data satisfies the prescribed authentication condition.

19. The non-transitory computer readable storage medium according to claim 15, wherein the image processing apparatus is configured to be selectively placed in a first state in which the image process is capable of being executed and a second state in which the image process is incapable of being executed, and wherein the program instructions further comprise:
  determining whether the first state is switched to the second state after the image processing apparatus acquires the permission to use the server; and
  ending using the server when the first state is switched to the second state.

* * * * *

UNITED STATES PATENT AND TRADEMARK OFFICE
CERTIFICATE OF CORRECTION

PATENT NO. : 9,710,662 B2
APPLICATION NO. : 14/258057
DATED : July 18, 2017
INVENTOR(S) : Thanh Nguyenvan It is certified that error appears in the above-identified patent and that said Letters Patent is hereby corrected as shown below:

In Column 16, Claim 1, Line 36:
After "data;" please insert --¶ determine whether a capability condition is satisfied, the capability condition being that an image process is capable of being executed;--

In Column 17, Claim 5, Line 33:
Please delete "to notify the received new" and insert --to provide a notification of the received new--

In Column 17, Claim 6, Line 37:
Please delete "image process is capable of" and insert --image process is incapable of--

In Column 18, Claim 10, Line 43:
Please delete "receive a setting about whether to perform" and insert --receiving a setting about whether to perform--

In Column 18, Claim 10, Line 45:
Please delete "determine whether a setting condition is satisfied" and insert --determining whether a setting condition is satisfied--

In Column 19, Claim 11, Line 19:
Please delete "data satisfied the prescribed authentication" and insert --data satisfies the prescribed authentication--

Signed and Sealed this
Twentieth Day of March, 2018

Andrei Iancu
*Director of the United States Patent and Trademark Office*